3,376,250
ULTRAVIOLET LIGHT STABILIZED, ZINC OXIDE PIGMENTED, 1-OLEFIN RESIN COMPOSITION
Gordon C. Newland and John W. Tamblyn, Kingsport, Tenn., assignors to Eastman Kodak Company, Rochester, N.Y., a corporation of New Jersey
No Drawing. Filed Jan. 22, 1965, Ser. No. 427,499
5 Claims. (Cl. 260—41)

ABSTRACT OF THE DISCLOSURE

A normally solid, white, thermoplastic composition for shaping into articles comprising (1) polyethylene or a copolymer of propylene and butene-1, (2) a pigmenting amount of zinc oxide, and (3) a stabilizing amount of zinc N,N-dialkyldithiocarbamate or 2,6-didodecyl-p-cresol when (1) is polyethylene, or a stabilizing amount of zinc N,N-dialkyl-dithiocarbamate or dialkyl - 3,3' - thiodipropionate when (1) is a copolymer of propylene and butene-1.

---

This invention resides in the chemical arts. It relates to synthetic resins and to the problem of inhibiting their deterioration under ultraviolet light.

Normally solid polymers of 1-olefins, such as normally solid polyethylene and crystalline polypropylene, are thermoplastic synthetic resins which have gained widespread use as materials of construction. However, as is well known, normally solid, 1-olefin resins undergo photochemical degradation when exposed to ultraviolet light. This effect is frequently termed weathering. It appears to be a photooxidation process which causes rupture of the polymer chains and formation of carbonyl ($=C=O$) groups. As this degradation progresses, articles manufactured from 1-olefin resins tend to crack, become brittle and lose tensile strength to the extent of mechanical failure.

White plastic compositions are often wanted. Such compositions are normally made by incorporating a white pigment such as finely divided zinc oxide, finely divided titanium dioxide and the ilke into plastics by conventional mixing procedures. Unfortunately, these pigments offer very little protection against ultraviolet light degradation. Indeed, when finely divided titanium dioxide, for example, is incorporated into polyethylene, the result is an acceleration of ultraviolet light degradation.

This invention is based upon the discovery that certain mixtures of finely divided zinc oxide and specific organic compounds, when incorporated into particular 1-olefin resins, not only enhance the weatherability of these resins, but do so synergistically.

In summary, this invention comprises a normally solid, white, thermoplastic composition consisting essentially of (A) normally solid, 1-olefin resin selected from the group consisting of normally solid polyethylene and copolymer of propylene and butene-1, (B) finely divided zinc oxide at a concentration sufficient to substantially pigment said 1-olefin resin and (C) when said 1-olefin resin is normally solid polyethylene, 0.1–1% by weight of said resin of material selected from the group consisting of zinc N,N-di ($C_1$–$C_{20}$ alkyl)dithiocarbamate and 2,6-didodecyl-p-cresol, and when said 1-olefin resin is said copolymer, 0.1–1% by weight of said resin of material selected from the group consisting of zinc N,N-di($C_1$–$C_{20}$ alkyl)dithiocarbamate and dilauryl 3,3'-thiodipropionate.

Normally solid polyethylene and normally solid copolymer of propylene and 1-butene are well known 1-olefin resins and, therefore, need not be further described herein.

Zinc oxide is a well known white pigment. In general, it is a finely divided solid. A concentration of finely divided zinc oxide in the composition of this invention generally at about 0.25–10% by weight of the 1-olefin resin is usually sufficient to substantially pigment it.

The remaining components of the basic composition of this invention are well known compounds and, therefore, need not be further described herein.

The normally solid, thermoplastic composition of this invention can also comprise other additives such as, for example, antioxidants, heat stabilizers, additional ultraviolet light inhibitors, anticorrosion additives, antistatic agents, foaming agents, plasticizers, waxes, mold release agents, slip agents, anti-blocking agents, fillers, extenders and the like, including physical property improvers other than polymeric compounds.

The plastic composition of this invention is made by incorporating the components thereof into the 1-olefin resin. Generally such incorporation is performed by any one of a number of well known methods, such as roll compounding, extrusion, solvent mixing and the like. For example, such incorporation can be performed by heating or otherwise softening the 1-olefin resin to a workable consistency and then working in as by roll compounding until a substantially uniform mixture or dispersion is obtained.

The resulting plastic composition of this invention is then usually formed into articles such as pellets, sheeting, films, bars, tubes, filaments, specially shaped articles and the like as by conventional casting and molding techniques which include extrusion, compression molding, blow molding and the like.

This invention is further illustrated by the following examples of various aspects thereof including specific embodiments. Unless otherwise indicated this invention is not limited to these specific embodiments.

Examples 1–2

These examples illustrate specific embodiments of a white polyethylene composition according to this invention.

These specific embodiments are formulated as follows:

| Components | Concentration in Parts by Wt. | |
| --- | --- | --- |
| | Ex. 1 | Ex. 2 |
| Normally solid polyethylene | 100 | 100 |
| Finely divided zinc oxide | 10 | 10 |
| Zinc N,N-dibutyldithiocarbamate | 0.5 | |
| 2,6-didodecyl-p-cresol | | 0.5 |

These specific embodiments are made by admixing the components for 4 minutes on hot compounding rolls, the front roll being at 270° F. and the rear roll at 220° F.

The products thus obtained are white polyethylene compositions useful in articles likely to be exposed to ultraviolet light.

Examples 3–4

These examples illustrate specific embodiments of a white composition according to this invention, which is based on copolymer of propylene and 1-butene.

These specific embodiments are formulated as follows:

| Compounds | Concentration in Parts by Wt. | |
| --- | --- | --- |
| | Ex. 3 | Ex. 4 |
| Normally solid copolymer of propylene and 1-butene, the weight ratio of proplylene to 1-butene being 80:20 | 100 | 100 |
| Finely divided zinc oxide | 10 | 10 |
| Zinc N,N-dibutyldithiocarbamate | 1 | |
| Dilauryl 3,3'-thiodipropionate | | 1 |

These specific embodiments are made by admixing the components for four minutes on hot compounding rolls, the front roll being at 320° F. and the rear roll at 285° F.

The products thus obtained are useful in shaped articles likely to be exposed under normal use conditions to ultraviolet light.

Samples of the composition of this invention have actually been tested for ultraviolet light stability. In the first series of tests, samples were made from a conventional, low density, normally solid polyethylene having a melt index of 2. The samples were made by the procedure described in connection with Examples 1–2 and included samples formulated as indicated in the following table. Flat plates of 125 mils thickness were compression molded from the samples and three test specimens 1.5 x 0.5 inch were cut from the molded plates. The test specimens were bent into U-shape and while thus stressed mounted upside down in a ½ inch wide channel. The stress test specimens while mounted in the channel were then placed in an Atlas Twin-Arc Weather-Ometer [Anal. Chem. 25, 460 (1953)]. While exposed the specimens were periodically inspected for the development of cracks visible under 3× magnification. When such stress cracks were observed in a specimen, the exposure time for that specimen was determined. When all three specimens of a sample had developed stress cracks, the stress crack free life of the sample was then calculated, it being the averaged exposure time required for all thre specimens to develop stress cracks. Test data for the samples reported herein are summarized in the following table.

| Components | Concentration in Parts by Weight | | | | | |
|---|---|---|---|---|---|---|
| | Sample 1 | Sample 2 | Sample 3 | Sample 4 | Sample 5 | Sample 6 |
| Normally solid copolymer | 100 | 100 | 100 | 100 | 100 | 100 |
| Zinc oxide | | 10 | | | 10 | 10 |
| Zinc N,N-dibutyldithiocarbamate | | | 1.0 | | 1.0 | |
| Dilauryl 3,3'-thiodiproprionate | | | | 10.0 | | 1.0 |
| | Hours | | | | | |
| Stress crack free life | 147 | 162 | 238 | 185 | 1,130 | 1,160 |

Samples 5 and 6 correspond to the specific embodiments of Examples 1 and 2.

From these data it can be seen that the compositions of this invention have a substantial degree of stability relative to ultraviolet light. Moreover, the data show that in the compositions of this invention zinc oxide and the other additives cooperate synergistically to inhibit the ultraviolet light deterioration of polyethylene.

In another series of tests samples were made from a normally solid copolymer of propylene and 1-butene at a weight ratio of propylene to 1-butene of 80:20. The normally solid copolymer had a density of 0.889 and an inherent viscosity of 2.35. The samples were made according to the procedure described in connection with Examples 3–4. The samples made included the samples formulated as indicated in the following table. The product obtained in each case was compression molded into a flat plate 125 mils thick. Three test specimens 1.5 inches x 0.5 inch were cut from the molded plate of each sample, bent into U-shape and while thus stressed mounted into a 0.5 inch wide channel. The channel was then placed into a modified Atlas Twin-Arc Weather-Ometer. The specimens were periodically inspected for the development of stress cracks visible under 3× magnification. When each specimen was observed to have developed stress cracks, the exposure time for that specimen was calculated. When all three specimens had developed stress cracks the stress crack free life of the sample was calculated. The stress crack free life is the averaged exposure time required for all three specimens to develop stress cracks. The test data of the samples reported herein are summarized in the following table.

| Components | Concentration in Parts by Weight | | | | | |
|---|---|---|---|---|---|---|
| | Sample 1 | Sample 2 | Sample 3 | Sample 4 | Sample 5 | Sample 6 |
| Normally solid polyethylene | 100 | 100 | 100 | 100 | 100 | 100 |
| Finely divided zinc oxide | | 10 | | | 10 | 10 |
| Zinc N,N-dibutyldithiocarbamate | | | 0.5 | | 0.5 | |
| 2,6-didodecyl-p-cresol | | | | 0.5 | | 0.5 |
| | Hours | | | | | |
| Stress crack free life | 300 | 300 | 320 | 330 | 1,850 | 1,200 |

These data show that samples 5 and 6 correspond to the specific embodiments of Examples 3 and 4. Samples 5 and 6 are not only substantially stabilized relative to ultraviolet light, but are so stabilized by the synergistic coaction between zinc oxide and the organic compounds added.

Thus, this invention provides a white thermoplastic composition having a substantial degree of stability against ultraviolet light.

Other features, advantages and embodiments of this invention will be apparent to those in the exercise of ordinary skill in the art after reading the foregoing disclosures. In this connection, while specific embodiments of this invention have been described in considerable detail, variations and modifications of these embodiments can be effected without departing from the spirit and scope of the invention as disclosed and claimed.

We claim:

1. A normally solid, white, thermoplastic composition consisting essentially of (A) normally solid, 1-olefin resin selected from the group consisting of normally solid polyethylene and copolymer of propylene and butene-1 at a weight ratio of propylene to butene-1 of 80:20, (B) finely divided zinc oxide at a concentration of about 0.25–10% by weight of said 1-olefin resin and (C) when said 1-olefin resin is normally solid polyethylene 0.1–1% by weight of said resin of material selected from the group consisting of zinc N,N-dibutyldithiocarbamate and 2,6-didodecyl-p-cresol and when said 1-olefin resin is said copolymer 0.1–1% by weight of said resin of material selected from the group consisting of zinc N,N-dibutyldithiocarbamate and dilauryl 3,3'-thiodipropionate.

2. A normally solid, white, thermoplastic composition consisting essentially of normally solid polyethylene, finely divided zinc oxide at a concentration of about 0.25–10% by weight of said polyethylene and zinc, N,N-dibutyldithiocarbamate at a concentration of about 0.1–1% by weight of said polyethylene.

3. A normally solid, white, thermoplastic composition consisting essentially of normally solid polyethylene, finely divided zinc oxide at a concentration of about 0.25 to about 10% by weight of said polyethylene and 2,6-didodecyl-p-cresol at a concentration of about 0.1–1.0% by weight of said polyethylene.

4. A normally solid, white, thermoplastic composition consisting essentially of (A) normally solid, 1-olefin resin selected from the group consisting of normally solid polyethylene and copolymers of propylene and butene-1 at a weight ratio of propylene to butene-1 of 80:20, (B) finely divided zinc oxide at a concentration of about 0.25–10% by weight of said 1-olefin resin, and (C) 0.1–1% by weight of said resin of zinc N,N-dibutyldithiocarbamate.

5. A shaped article of composition according to claim 1.

References Cited

UNITED STATES PATENTS

| | | | |
|---|---|---|---|
| 2,582,510 | 1/1952 | Stiratelli | 260—45–75 |
| 2,972,596 | 2/1961 | Newland | 260—45–75 |
| 3,001,969 | 9/1961 | Tholstrup | 260—45–75 |
| 3,111,499 | 10/1963 | Henck | 260—41 |
| 2,519,755 | 8/1950 | Gribbins | 260—41 |
| 2,801,225 | 7/1957 | Harding | 260—41 |

OTHER REFERENCES

Raff: High Polymers, vol. XX, 1964, part II, p. 382 and 383, copy in S. L.

JULIUS FROME, *Primary Examiner*.